United States Patent [19]

Kumar et al.

[11] Patent Number: 4,621,189

[45] Date of Patent: Nov. 4, 1986

[54] HAND HELD DATA ENTRY APPARATUS

[75] Inventors: Rajendra Kumar; Robert F. Meyerson, both of Akron, Ohio

[73] Assignee: Telxon Corporation, Akron, Ohio

[21] Appl. No.: 785,604

[22] Filed: Oct. 8, 1985

[51] Int. Cl.⁴ .............................................. G06K 7/10
[52] U.S. Cl. ..................................... 235/472; 235/454
[58] Field of Search .............................. 235/472, 454

[56] References Cited

U.S. PATENT DOCUMENTS 3,826,900 7/1974 Moellering ........................ 235/472

Primary Examiner—Harold I. Pitts
Attorney, Agent, or Firm—Haight & Hofeldt

[57] ABSTRACT

A hand held data entry apparatus wherein a main body portion is formed to be held in one hand while data is entered through a keyboard by the fingers of the other hand. An optical scanning head is mechanically and electrically connected to the main body portion through an arrangement which permits the optical scanning head to be connected to the main body portion in more than one relative position. The scanning head sensor is pointed in a direction such that when the device is held in one hand the other hand may be utilized for entering data through the keyboard and at the same time the scanning head is directed toward the surface to be scanned, without need to reposition the main body portion.

17 Claims, 7 Drawing Figures

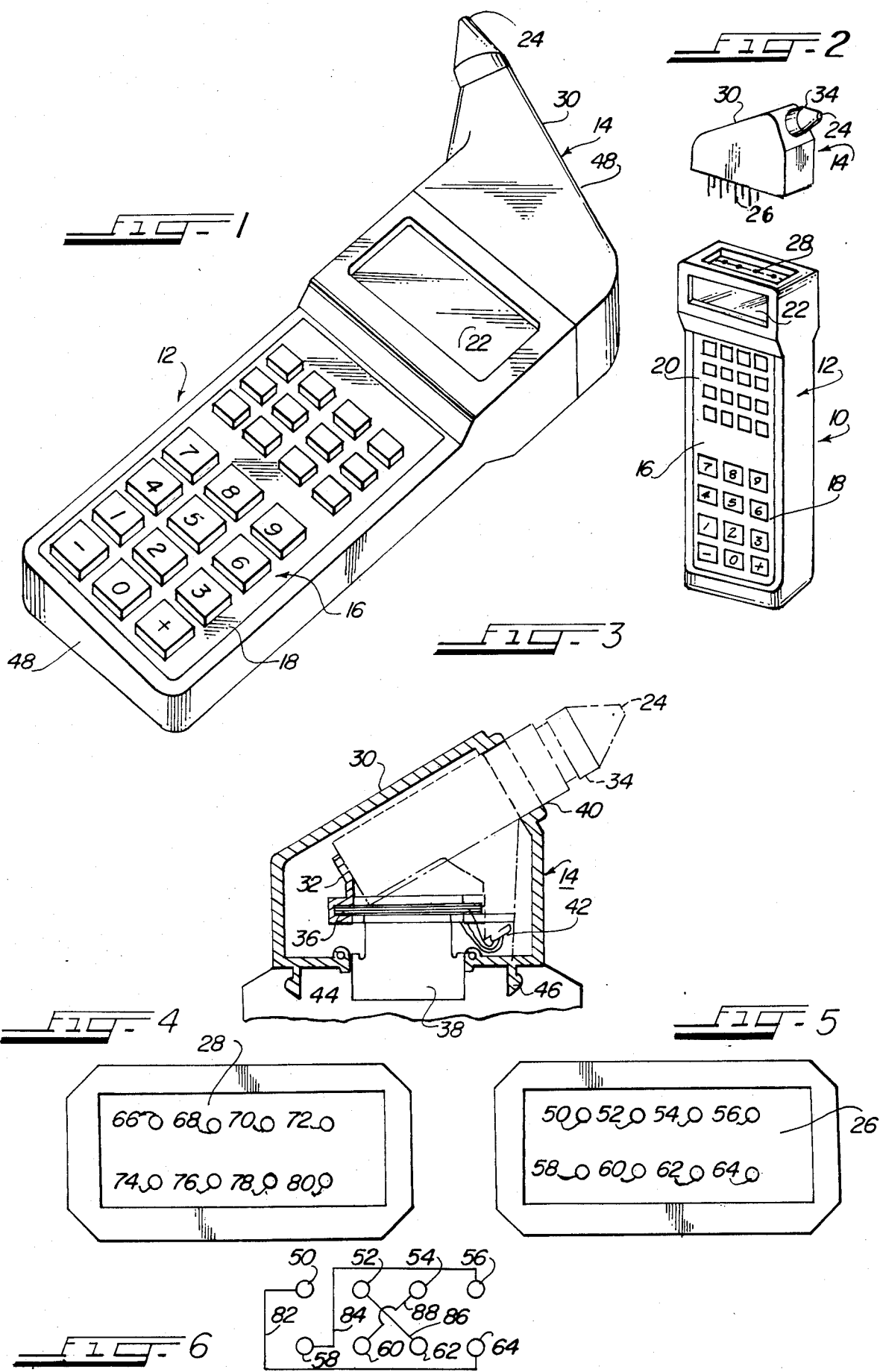

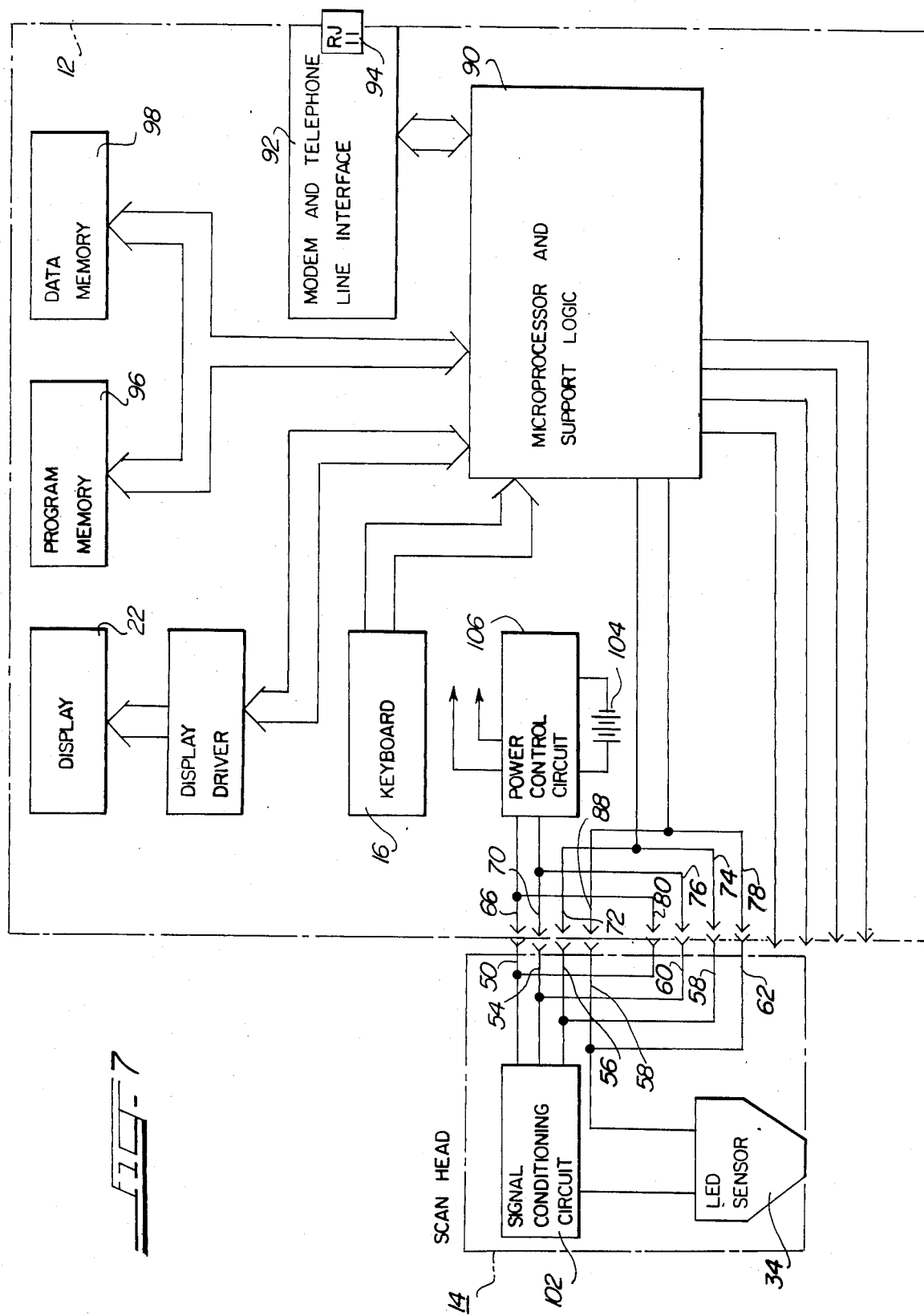

HAND HELD DATA ENTRY APPARATUS

BACKGROUND OF THE INVENTION

This invention relates generally to a hand held data entry apparatus, and more particularly to a hand held data entry unit having a scanning head which may be secured to the main body of the data entry unit in various positions, so as to accomodate the individual preference of the operator as to the fingers of which hand are used to enter data.

Hand held data entry devices have been provided wherein a scanning head is connected to a hand held data entry keyboard by a flexible cable. While such a unit is quite serviceable, it is at times inconvenient to use particularly when the operator needs to have a hand free to accomplish another task, such as moving items to be scanned or entering data through the keyboard. For instance, if the hand held unit is held in one hand for data entry through the keyboard with the other hand, it is obvious that the separate scanning head cannot be conveniently handled at the same time. A device of this general type is shown in the U.S. Pat. No. 3,991,299, issued on Nov. 9, 1976.

Hand held data entry units have been provided with integral scanning-heads, but without either a data entry keyboard or a visual information display means. While such a device is quite acceptable for signle handed scanning, the other hand being available for other tasks, it is limited in not providing a keyboard data entry means, or a visual means of displaying information. Such a device is shown in U.S. Pat. No. 4,471,218. Finally, hand held data entry units have been provided, which include an integral scanning-head, a data entry keyboard and a visual information display. However, in such devices the scanning heads are normally fixed in position with respect to the hand held unit, and normally project in the direction of the major axis of the body of the unit. With such units, it is most difficult to hold the unit in a single position which is most convenient for both entering data through the keyboard and by way of the scanning head. Rather, it is necessary with such units to continuously change the position of the device between that necessary for using the scanning head and that desirable for entering data through the keyboard. Further, such units are typically suited for only right or left handed keyboard entries. That is, with the scanning head projecting in the direction of the major axis, if the unit is held in the left hand with the scanning head pointing in the direction of the left thumb, the keyboard is upright in the left palm for entry of data by the fingers of the right hand. However, if the unit is transferred to the right hand, with the scanning head pointing in the direction of the right thumb, the keyboard will be upside down in the palm of the right hand, thereby making it very inconvenient to enter data with the finger of the left hand.

Accordingly, there is need for a hand held data entry apparatus which is provided with a scanning head which points in a direction from the hand held unit convenient for scanning, while the apparatus is held in one hand and the fingers of the other hand are used for making entries through the keyboard. Further, since the position of the scanning head with respect to the keyboard is dependent upon whether the operator wishes to use the fingers of the right or left hand for keyboard data entry, there is a need to provide a unit adaptable for data entry with the fingers of either the right or left hand of the operator, while still maintain the scanning head in a position convenient for the scanning.

SUMMARY OF THE INVENTION

It is therefore an object of this invention to provide a novel and improved hand held data entry apparatus provided with both a scanning head and a data entry keyboard, with the scanning head positioned for ease of scanning, when the unit is held in one hand in a position most convenient for entry of data by the fingers of the other hand.

It is another object of this invention to provide a hand held data entry apparatus including a data entry keyboard and scanning head wherein the direction in which an optical scanning or bar code reading means scans with respect to the hand held unit may be changed to accomodate the preference of the operator as to the hand, right or left, in which the units is held. This preference would be based on whether he operator desires to have the left or right hand free for other activities, such as moving materials to be scanned, or entering data through the keyboard.

The foregoing objects are accomplished in accordance with this invention by providing a hand held data entry apparatus including a hand held main body portion and a detachable scanning head. The detachable scanning head is attachable to the hand held main body portion in various positions, so as to adjust the scanning direction of the scanning head to a position most convenient to a particular operator. Mechanical and electrical connecting means are provided for mechanically and electrically connecting the scanning head to the main body portion of the data entry apparatus in more than one position. A non-polarized electrical connector is utilized. The individual contact elements of the connector are interconnected so that with respect to the scanning head and the main body portion, the same electrical connections are made, irrespective of the relative positions of the scanning head and the main body unit when connected together.

BRIEF DESCRIPTION OF THE DRAWINGS

FIG. 1 is a perspective view illustrating a hand held data entry unit, with a detachable scanning head, in accordance with the present invention;

FIG. 2 is a perspective view, with the scanning head detached, of the hand held data entry unit shown in FIG. 1;

FIG. 3 is a side elevation, cross sectional view of the scanning head of the hand held data entry unit shown in FIG. 1;

FIG. 4 is a plan view of the electrical connector provided on the main body portion of the hand held data entry unit of FIG. 1, for making connection with the detachable scanning head;

FIG. 5 is a plan view of the electrical connector provided on the scanning head for making connection with the electrical connector on the main body portion of the hand held data entry unit shown in FIG. 1;

FIG. 6 is a side elevation view, with portions broken away, to show the contacts of the connector in the main body portion of the hand held data entry unit of FIG. 1; and FIG. 7 is a circuit block diagram showing the electrical components included in both the main body portion and the detachable scanning head of the hand held data entry unit, shown in FIG. 1.

DESCRIPTION OF THE PREFERRED EMBODIMENT

Referring to FIG. 1 of the drawings, the hand held data entry terminal 10 of this invention is shown to include a hand held main body portion 12 and a detachable scanning head 14. The face of the hand held unit is provided with a keyboard 16 which, as illustrated, includes a three by four arrangement of twelve larger keys for the entry numerals 0 through 10 and a + (plus) and − (minus) sign, and also includes a three by four arrangement of twelve smaller keys for the entry of various functional commands. For the purpose of viewing information which is entered into the memory of the hand held data entry terminal, or which is transmitted to it from a host computer, a dot matrix LCD display 22 is provided. In a preferred arrangement, the display 22 is of two lines with sixteen characters in each line. The scanning head 14 includes an optical scanning device which projects light and receives reflected light through an aperture at tip 24 of scanning head 14. Such an optical scanning device is frequently used to read bar codes.

As is shown in FIG. 2, the scanning head 14 may be removed from the main body portion 12 of hand held data entry terminal 10. In a preferred embodiment, as shown in FIG. 2, the scanning head 14 is provided with projecting pin contacts 26, and the main body portion 12 is provided with recessed pin sockets 28. As shown in FIG. 3, the scanning head 14 includes a housing 30, as a part of which are formed internally projecting support members 32. Mounted within the housing 30 is an optical scanning or bar code reading means 34, a printed circuit board 36, and a connecter 38. In a preferred embodiment the bar code reading means 34 is a 6 mil or a 10 mil sensor wand of the type available from several manufacturers including Welch-Allyn and Opticon. It should be noted than an aperture 40 is provided in the housing 30 for receiving the bar code reading means 34, which at its internal end is engaged by the support member 32. As shown, particularly in FIG. 3, in the preferred embodiment of this invention the bar code reading means 34 is positioned at an angle of sixty degrees to the major axis 48 of the main body portion 12. Electrical leads 42 extending from the bar code reading means 34 are connected to the printed circuit board 36. Connections formed on the the printed circuit board 36 connect the electrical leads 42 to a signal conditioning circuit which is also formed on the printed circuit board 36. Also connected to the printed circuit board 36 are the plurality of pin contacts included in the connector 38.

It should be observed that when the scanning head 14 is engaged with the main body portion 12, i.e, going from the position shown in FIG. 2 to that shown in FIG. 1, not only does the connector 38 engage wih the mating portion of the connector in the main body portion 12, but also mechanical securing means 44 and 46, provided on the housing 30, engage the main body portion 12 to secure the scanning head 14 to the main body portion.

Referring to FIGS. 1, 2, and 3, it is noted that the scanning head 14 may be connected to the main body portion 12, with the projecting tip 24 extending either to the right or left of the major axis 48 of the main body portion 12, as viewed in FIG. 1. In order that the hand held data entry terminal 10 will work equally well with scanning head 14 secured to main body portion 12 in either of two positions, a particular contact arrangement is provided in the connectors. The particular contact arrangement may be understood by referring to FIGS. 4, 5, and 6. The projecting pin contacts 26 of scanning head 14 are shown in FIG. 4. The pin contacts 50,52,54,56,58,60,62, and 64 are arranged in two parallel rows of four pins each. Referring to FIG. 4, the mating recessed pin sockets 28 of the main body portion 12 are shown as 66,68,70,72,74,76,76,78, and 80. The pin sockets are also arranged in two parallel rows of four contacts each, such that when the scanning head 14 is engaged with the main body portion 12, the pins and pin sockets, as shown in FIGS. 4 and 5, will readily engage each other.

So that the scanning head may be secured to the main body portion 12 in either the orientation shown in FIG. 1, or that shown in FIG. 2, the projecting pin contacts 26 of the scanning head 14, or the recessed pin sockets 28 of the main body portion 12, or both, are connected to each other, as shown in FIG. 6. For the purpose of illustration, the interconnections are shown as being made between the pin contacts 26. Outer contacts 50 and 64 are electrically connected to each other by a lead 82, while the other pair of outer contacts 56 and 58 are connected by a lead 84. Contacts 52 and 62 of the inner set of contacts are connected by a lead 86, while the other pair of inner contacts 54 and 60 are connected by a lead 88. While leads 82,84,86, and 88 have been shown as interconnecting the contact pins 26, in the preferred embodiment, the connections are actually formed on the printed circuit board 36. While it is not necessary to do so, the interconnections may be made between both the pin sockets 28 and the pin contacts 26. Or the interconnections might only be made between the pin sockets 28.

Referring to FIG. 7, the electrical components which are contained in the main body portion 12 and in the scanning head 14 will be briefly described. The principal circuit element contained within the main body portion 12 is a microprocessor and support logic element 90. All of the other circuit components either provide or receive information from this element. Information can be provided to the logic element 90, or withdrawn from it, by means of a modem and telephone line interface 92 which includes a connector 94, such as a modular telephone jack which may be connected to a telephone, computer, or other electronic device. The main body portion 12 also contains two electronic memory devices 96 and 98, one of which (96) contains a program memory, and the other of which (98) contains a data memory. By custom design of the software utilized by the program memory 96 and the data memory 98, the hand held data entry terminal 10 may be customized for innumerable specific applications. Information may be provided to the microprocessor and support logic element 90 from either the keyboard 16, from the scanning head 14, or from a host computer such as by downloading. Using the keyboard 16 to provide the appropriate signals to the microprocessor and support logic element 90, information stored within or available to the element 90 may be supplied to a display driver circuit 100, which in turn provides the necessary signals to energize the display 22. The main body portion 12 also includes a battery 104 for energizing the electronic circuitry through a power control circuit 106.

As previously mentioned, the scanning head 14 includes a signal conditioning circuit which may be formed as part of the printed circuit board 36, as shown in FIG. 3, and also the light emitting diode and sensor forming the bar code reading means 34. It is also contemplated that with the removal of scanning head 14 from the main body portion 12, a connector having projecting pin contacts corresponding to pins 26 of the scanning head 14, could be used to connect the hand held data entry terminal to other devices, such as a host computer. For instance, the host computer may supply information to the hand held unit on a particular customer order, quantities, price, delivery schedule, etc.

While in accordance with the United States Patent Statutes, a preferred embodiment of the invention has been shown and described, various changes may be made in the hand held data entry apparatus of this invention, without departing from the true spirit and scope of this invention.

The appended claims are intended to cover all such changes and modifications as fall within the true spirit and scope of this invention.

We claim:

1. A hand held data entry apparatus comprising:
   hand held main body portion for receiving, storing and transmitting information, said main body portion having a major axis;
   scanning head including an optical scanning means; and
   means for electrically and mechanically connecting said scanning head to said main body portion, said means including an electrical connector having first and second mating contact portions, each including a plurality of contacts, said first mating portion being a part of said main body portion and said second mating portion being a part of said scanning head, said plurality of contacts in at least one of said mating contact portions being connected such that the same electrical connections are made between said first and second mating contact portions irrespective of the orientation of said mating contact portions with respect to each other when they are engaged, said optical scanning means facing in a direction which is at predetermined angle to the major axis of said main body portion, whereby the direction in which the scanning head faces may be oriented with respect to the main body portion to suit the convenience of the user.

2. The hand held data entry apparatus of claim 1, wherein said main body portion includes an electronic memory and a keyboard connected to input information to said memory, said scanning head being connected to said main body portion with the orientation of the connection of said main body portion and said scanning head depending on whether the user operates the keyboard with the fingers of the right or left hand.

3. The hand held data entry apparatus of claim 1, wherein the preferred orientations of the connection of said main body portion and said scanning head is such that the scanning head faces away from the thumb of the operators hand in which the main body portion is held.

4. The hand held data entry apparatus of claim 1, wherein said main body portion is of a rectangular shape, having longer and shorter sides, and is of a size such that said longer sides will fit in the palm of an operator's hand between the thumb and fingers, with the said scanning head extending at an angle to the major axis of said main body portion.

5. The hand held data entry apparatus of claim 1, wherein said plurality of contacts are arranged in two parallel rows, with four contacts in each row, the two inner contacts in each row forming an inner set of contacts and the two outer contacts in each row forming an outer set of contacts, with the contacts of the inner set of four contacts being diagonally connected to each other, and with the contacts of the outer set of four contacts being diagonally connected to each other, such that in either of the two possible ways of connecting the first and second mating contact portions, the same contacts in the first and second mating contact portions are electrically connected to each other.

6. The hand held data entry apparatus of claim 1, wherein said scanning head includes a printed circuit board though which electrical connections are made between said optical scanning means and said second mating portion.

7. The hand held data entry apparatus of claim 1, wherein said scanning head includes a housing which is provided with means for supporting said optical scanning means and said second mating portion.

8. The hand held data entry apparatus of claim 7, wherein first and second mating securing means are provided on said main body portion and said scanning head housing, respectively, for securing said scanning head to said main body portion.

9. The hand held date entry apparatus of claim 1, wherein said predetermined angle is approximately 60 degrees.

10. The hand held data entry apparatus of claim 1, wherein said optical scanning means is particularly suited for reading bar codes.

11. A hand held data entry apparatus comprising:
    a hand held main body portion for receiving, storing and transmitting information, said main body portion having a major axis;
    a scanning head including an optical scanning means;
    first electrical and mechanical connector means on said main body portion; and
    second electrical and mechanical connector means on said scanning head, said first and second connector means being adapted to be joined together in more than one position with respect to each other, such that said optical scanning means may face in at least two different directions with respect to the major axis of said main body portion, the same electrical connections being made between said scanning head and said main body portion without regard to the relative positions in which said scanning head and main body portion are joined together.

12. The hand held data entry apparatus of claim 11, wherein said main body portion includes an electronic memory and a keyboard connected to input information to said memory, said scanning head being connected to said main body portion with the orientation of the connection of said main body portion and said scanning head depending on whether the user operates the keyboard with the fingers of the right or left hand.

13. The hand held data entry apparatus of claim 11, wherein the preferred orientations of the connection of said main body portion and said scanning head is such that the scanning head faces away from the thumb of the operators hand in which the main body portion is held.

14. The hand held data entry apparatus of claim 11, wherein said main body portion is of a rectangular shape, having longer and shorter sides, and is of a size such that said longer sides will fit in the palm of an operator's hand between the thumb and fingers, with the said scanning head extending at an angle to the major axis of said main body portion.

15. The hand held data entry apparatus of claim 11, wherein said scanning head includes a printed circuit board through which electrical connections are made between said optical scanning means and said second mating portion.

16. The hand held data entry apparatus of claim 11, wherein said scanning head includes a housing which is provided with means for supporting said optical scanning means and said second electrical and mechanical connector means.

17. The hand held data entry apparatus of claim 11, wherein said optical scanning means is particularly suited for reading bar codes.

* * * * *